United States Patent
Zhu et al.

(10) Patent No.: US 10,050,284 B2
(45) Date of Patent: Aug. 14, 2018

(54) PROCESS FOR ONE-STEP PREPARING ELECTROLYTE USED FOR LITHIUM-IRON(II) DISULFIDE BATTERIES

(71) Applicant: EVE ENERGY CO., LTD., Huizhou (CN)

(72) Inventors: Yuan Zhu, Huizhou (CN); Chen Cheng, Huizhou (CN); Yanbin Wang, Huizhou (CN); Jianhua Liu, Huizhou (CN); Jincheng Liu, Huizhou (CN)

(73) Assignee: EVE ENERGY CO., LTD., Huizhou, Guangdong (CN)

( * ) Notice: Subject to any disclaimer, the term of this patent is extended or adjusted under 35 U.S.C. 154(b) by 65 days.

(21) Appl. No.: 15/129,310

(22) PCT Filed: Mar. 31, 2016

(86) PCT No.: PCT/CN2016/078129
§ 371 (c)(1),
(2) Date: Sep. 26, 2016

(87) PCT Pub. No.: WO2017/024801
PCT Pub. Date: Feb. 16, 2017

(65) Prior Publication Data
US 2017/0179500 A1    Jun. 22, 2017

(30) Foreign Application Priority Data

Aug. 10, 2015   (CN) .......................... 2015 1 0486445
Aug. 10, 2015   (CN) .......................... 2015 1 0487588

(51) Int. Cl.
*H01M 6/16*    (2006.01)
(52) U.S. Cl.
CPC ........... *H01M 6/164* (2013.01); *H01M 6/166* (2013.01); *H01M 2300/0037* (2013.01)

(58) Field of Classification Search
CPC .. H01M 6/164; H01M 2300/0037; C01F 7/48
See application file for complete search history.

(56) References Cited

U.S. PATENT DOCUMENTS

| 6,984,367 B2 * | 1/2006 | Wietelmann ........... C01D 15/04 423/499.1 |
| 2004/0033191 A1 | 2/2004 | Wietelmann et al. |
| 2015/0270571 A1 * | 9/2015 | Kambara .......... H01M 10/0525 429/319 |
| 2015/0372342 A1 * | 12/2015 | Zidan .................. H01M 10/052 320/128 |

FOREIGN PATENT DOCUMENTS

| CN | 101 227 002 | 7/2008 | |
| CN | 103137981 B | * 10/2014 | ............. H01M 6/16 |
| CN | 105 098 203 | 11/2015 | |
| CN | 105 186 014 | 12/2015 | |

* cited by examiner

*Primary Examiner* — Cynthia Harris Kelly
*Assistant Examiner* — Monique M Wills
(74) *Attorney, Agent, or Firm* — Fay Kaplun & Marcin, LLP

(57) ABSTRACT

Disclosed is a process for one-step preparing electrolyte used for lithium-iron(II) disulfide batteries. The process includes the following steps of: adding iodine-containing precursors into an organic solvent in an inert atmosphere, homogeneously stirring, then adding lithium-containing precursors, stirring and reacting, separating solids to obtain an electrolyte used for lithium-iron(II) disulfide batteries. The process involves one-step synthesizing electrolyte used for lithium-iron(II) disulfide batteries. The whole procedures do not introduce water and have a lower cost. The lithium-iron(II) disulfide batteries prepared by using the electrolyte prepared by the process of the present invention have better properties.

8 Claims, No Drawings

PROCESS FOR ONE-STEP PREPARING ELECTROLYTE USED FOR LITHIUM-IRON(II) DISULFIDE BATTERIES

TECHNICAL FIELD

The present invention belongs to the technical field of primary lithium batteries, and involves the electrolyte used for lithium-iron(II) disulfide batteries, and specifically relates to a process for one-step preparing electrolyte used for lithium-iron(II) disulfide batteries.

BACKGROUND ART

Primary lithium batteries are divided into high-voltage and low-voltage batteries according to open-circuit voltage. If the open-circuit voltage is greater than or equal to 3.0V, it is high-voltage primary lithium battery, e.g. lithium-thionyl chloride ($Li/SOCl_2$) batteries, lithium-manganese dioxide ($Li/MnO_2$) batteries and lithium-lithium carbon fluoride($Li/CF_x$) batteries; if the open-circuit voltage is less than 3.0V, it is low-voltage primary lithium battery, e.g. lithium-iron(II) disulfide ($Li/FeS_2$) batteries.

Since $Li/FeS_2$ batteries are low-voltage primary batteries and have an operating voltage platform of 1.5V, they have interchangeability with alkaline manganese ($Zn/MnO_2$) batteries, Ni-MH batteries, carbon batteries or zinc silver batteries having the same size. However, $Li/FeS_2$ batteries have more excellent properties, e.g. $Li/FeS_2$ batteries have higher mass ratio energy, AA-type $Li/FeS_2$ batteries have a mass ratio energy as high as 310 W·h/kg; alkaline manganese ($Zn/MnO_2$) batteries, Ni-MH batteries, carbon batteries or zinc silver batteries having the same size have a mass ratio energy of only 55~154 W·h/kg. $Li/FeS_2$ batteries have better low-temperature performance than common $Zn/MnO_2$ batteries. Because of aqueous electrolyte, the suitable occasions for $Zn/MnO_2$ are those at a temperature of higher than 0° C.; while $Li/FeS_2$ batteries can still work under conditions of −40° C. Therefore, $Li/FeS_2$ batteries have better market prospects.

Since the negative electrode of $Li/FeS_2$ batteries is lithium or lithium alloys, water will destroy SEI film (solid electrolyte interface film) on the surface of the negative electrode and affect the electrical properties and storage life of batteries, so that water in each part shall be strictly controlled. However, water in the electrolyte is hard to control. For example, the electrolyte solvents DME and 1,3-dioxolane can be dehydrated via molecular sieves to control the water less than 10 ppm. Water in salts (primarily anhydrous lithium iodide) of the electrolyte is hard to remove.

At present, the process for preparing anhydrous lithium iodide (LiI) generally comprises two steps: first synthesizing lithium iodide ($LiI_xH_2O$, wherein x is 0.2-3) containing crystal water; second, removing crystal water in $LiI_xH_2O$. The invention patent having publication No. CN103137981A discloses preparing lithium iodide solids containing crystal water by using elemental iodine, iron powder and lithium hydroxide, then dissolving lithium iodide solids containing crystal water in an organic solvent, then electrochemically electrolyzing under actions of catalytic reduction electrode and lithium electrode, filtering after electrolysis, removing the organic solvent from filtrate to obtain anhydrous lithium iodide. The invention patent having publication No. CN101565192A discloses dehydrating lithium iodide solution to lithium iodide powder containing 0.5-1 crystal water, then vacuum heating and dehydrating to obtain anhydrous lithium iodide.

At high temperature, $LiI_xH_2O$ will be easily hydrolyzed and oxidized to produce impurities such as lithium hydroxide, elemental iodine, hydroiodic acid. Therefore, anhydrous lithium iodide products prepared by two steps (preparing $LiI_xH_2O$ in a first step and removing crystal water in a second step) have shortcomings of low purity, low yield, and trace water in prepared anhydrous LiI. The shortcomings of low purity and trace water in prepared anhydrous LiI will directly affect the electrical properties of $Li/FeS_2$ batteries, even make the prepared batteries scrapped. Low yield of anhydrous LiI will render a higher cost of formulated electrolyte.

Currently, $Li/FeS_2$ battery electrolyte is formulated by two steps: first, homogeneously mixing anhydrous solvents in certain ratio; second, adding a certain amount of anhydrous lithium iodide prepared or purchased into the solvents and mixing the same homogeneously, to obtain $Li/FeS_2$ battery electrolyte. However, such formulation process has the following problems: first, the anhydrous lithium iodide prepared or purchased has a high cost; second, two steps of such process readily result in introduction of water or new impurities during the formulation.

DISCLOSURE OF THE INVENTION

The present invention relates to a process for one-step preparing electrolyte used for lithium-iron(II) disulfide batteries. The process involves one-step synthesizing electrolyte used for lithium-iron(II) disulfide batteries. The whole procedures introduce no water and have a lower cost. The lithium-iron(II) disulfide batteries prepared have better properties.

A process for one-step preparing electrolyte used for lithium-iron(II) disulfide batteries comprises the following steps of: adding iodine-containing precursors into an organic solvent in an inert atmosphere, homogeneously stirring, then adding lithium-containing precursors, stirring and reacting, separating solids to obtain an electrolyte used for lithium-iron(II) disulfide batteries.

Specifically, the preparation process of the present invention is stated as follows.

A process for one-step preparing electrolyte used for lithium-iron(II) disulfide batteries comprises the following steps of: adding elemental iodine at 0-5° C. into an organic solvent in an inert atmosphere, homogeneously stirring, then adding lithium aluminum hydride or lithium hydride, stirring and reacting for 1-2 h, and increasing the temperature to 40-60° C., stirring and reacting 2-3 h, centrifuging and filtering to obtain an electrolyte used for lithium-iron(II) disulfide batteries.

In the preparation process above, the reaction has the following equations

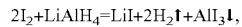

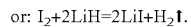

In order to make the reaction equations proceed in the direction of producing lithium iodide (LiI), lithium aluminum hydride or lithium hydride is added in excessive amount.

Preferably, the elemental iodine and lithium aluminum hydride have a molar ratio of 2:(1-4).

More preferably, the elemental iodine and lithium aluminum hydride have a molar ratio of 1:1.

Preferably, the elemental iodine and lithium hydride have a molar ratio of 1:(2-8).

More preferably, the elemental iodine and lithium hydride have a molar ratio of 1:4.

The inert gas in the inert atmosphere is one selected from the group consisting of nitrogen and argon.

In order to introduce no impurities or water during the preparation process, the inert atmosphere has a gas purity of greater than or equal to 99.99%, a moisture content of less than or equal to 10 ppm and an oxygen content of less than or equal to 0.5 ppm.

In order to reduce water in the prepared electrolyte as much as possible, the organic solvent is dehydrated before use.

Preferably, the dehydrated organic solvent has a moisture content of less than or equal to 10 ppm. Preferably, the organic solvent is dehydrated by using molecular sieves.

Preferably, the organic solvent is a mixed solvent of glycol dimethyl ether and 1,3-dioxolame; more preferably, the organic solvent is a mixed solvent of 25-45 wt. % of glycol dimethyl ether and 55-75 wt. % of 1,3-dioxolame.

Another process for one-step preparing electrolyte used for lithium-iron(II) disulfide batteries comprises the following steps of: adding anhydrous aluminum triiodide at 40-70° C. into an organic solvent in an inert atmosphere, stirring for 0.5-2 h, then adding anhydrous lithium hydride, stirring and reacting for 6-8 h, centrifuging and filtering to obtain an electrolyte used for lithium-iron(II) disulfide batteries.

In the preparation process above, the reaction has the following equation $$AlI_3 + 3LiOH = 3LiI + Al(OH)_3 \downarrow$$

In order to make the reaction equation proceed in the direction of producing lithium iodide (LiI), anhydrous lithium hydroxide is added in excessive amount.

Preferably, the anhydrous aluminum triiodide and anhydrous lithium hydroxide have a molar ratio of 1:(3.6-10).

More preferably, the anhydrous aluminum triiodide and anhydrous lithium hydroxide have a molar ratio of 1:6.

The inert gas in the inert atmosphere is one selected from the group consisting of nitrogen and argon.

In order to introduce no impurities or water during the preparation process, the inert atmosphere has a gas purity of greater than or equal to 99.99%, a moisture content of less than or equal to 10 ppm and an oxygen content of less than or equal to 0.5 ppm.

In order to reduce water in the prepared electrolyte as much as possible, the organic solvent is dehydrated before use.

Preferably, the dehydrated organic solvent has a moisture content of less than or equal to 10 ppm. Preferably, the organic solvent is dehydrated by using molecular sieves.

Preferably, the organic solvent is a mixed solvent of glycol dimethyl ether and 1,3-dioxolame; more preferably, the organic solvent is a mixed solvent of 25-45 wt. % of glycol dimethyl ether and 55-75 wt. % of 1,3-dioxolame.

Some of advantages of the present invention are as follows:
1. The present invention involves a process for one-step synthesizing electrolyte used for lithium-iron(II) disulfide batteries, which reduces technological procedures, avoids introduction of new impurities and saves production cost.
2. The whole procedures introduce no water, and the synthesized lithium iodide contains no crystal water, which avoids complex process of removing crystal water in lithium iodide and reduces production cost. The test results show that the lithium-iron(II) disulfide batteries prepared from the prepared electrolyte have better properties.

EMBODIMENTS

The present invention is further described in details by combining with the following examples, but the embodiments of the present invention are not limited thereby.

Example 1

A process for one-step preparing electrolyte used for lithium-iron(II) disulfide batteries comprises the following steps of: in a glove box having an atmosphere containing nitrogen with a purity of greater than or equal to 99.99% as an inert gas, an oxygen content of 0.5 ppm and a moisture content of 1.5 ppm, adding 0.5 mol of anhydrous elemental iodine at 0° C. into 1 L of a mixed solution of glycol dimethyl ether and 1,3-dioxolame and homogeneously stirring, then slowly adding 0.5 mol of lithium aluminum hydride, stirring and reacting for 1 h, then increasing the temperature to 40° C., stirring and reacting for 2 h, centrifuging, filtering to obtain an electrolyte used for lithium-iron(II) disulfide batteries;

wherein the mixed solution comprises 25 wt. % of glycol dimethyl ether and 75 wt. % of 1,3-dioxolame; the mixed solution was dehydrated with molecular sieves to a moisture content of less than or equal to 10 ppm before use.

The resultant electrolyte was tested to obtain a moisture content of 25.8 ppm and an electric conductivity at 25±2° C. of 2.59 ms/cm.

Example 2

A process for one-step preparing electrolyte used for lithium-iron(II) disulfide batteries, the method and steps are substantially the same as those in Example 1. The difference lies in replacing 0.5 mol of lithium aluminum hydride to 2 mol of lithium hydride.

The resultant electrolyte was tested to obtain a moisture content of 22.8 ppm and an electric conductivity at 25±2° C. of 2.25 ms/cm.

Example 3

A process for one-step preparing electrolyte used for lithium-iron(II) disulfide batteries comprises the following steps of: in a glove box having an atmosphere containing nitrogen with a purity of greater than or equal to 99.99% as an inert gas, an oxygen content of 0.5 ppm and a moisture content of 1.5 ppm, adding 1 mol of anhydrous elemental iodine at 0° C. into 1 L of a mixed solution of glycol dimethyl ether and 1,3-dioxolame and homogeneously stirring, then slowly adding 1 mol of lithium aluminum hydride, stirring and reacting for 1 h, then increasing the temperature to 40° C., stirring and reacting for 2 h, centrifuging, filtering to obtain an electrolyte used for lithium-iron(II) disulfide batteries;

wherein the mixed solution comprises 25 wt. % of glycol dimethyl ether and 75 wt. % of 1,3-dioxolame; the mixed solution was dehydrated with molecular sieves to a moisture content of less than or equal to 10 ppm before use.

The resultant electrolyte was tested to obtain a moisture content of 17.8 ppm and an electric conductivity at 25±2° C. of 8.5 ms/cm.

Example 4

A process for one-step preparing electrolyte used for lithium-iron(II) disulfide batteries, the method and steps are substantially the same as those in Example 3. The difference lies in replacing 1 mol of lithium aluminum hydride to 4 mol of lithium hydride.

The resultant electrolyte was tested to obtain a moisture content of 15.8 ppm and an electric conductivity at 25±2° C. of 7.75 ms/cm.

Example 5

A process for one-step preparing electrolyte used for lithium-iron(II) disulfide batteries, the method and steps are substantially the same as those in Example 3. The difference lies in replacing 1 mol of lithium aluminum hydride to 2 mol of lithium aluminum hydride.

The resultant electrolyte was tested to obtain a moisture content of 12.8 ppm and an electric conductivity at 25±2° C. of 8.9 ms/cm.

Example 6

A process for one-step preparing electrolyte used for lithium-iron(II) disulfide batteries, the method and steps are substantially the same as those in Example 3. The difference lies in replacing 1 mol of lithium aluminum hydride to 4 mol of lithium hydride.

The resultant electrolyte was tested to obtain a moisture content of 9.7 ppm and an electric conductivity at 25±2° C. of 8.35 ms/cm.

Example 7

A process for one-step preparing electrolyte used for lithium-iron(II) disulfide batteries, the method and steps are substantially the same as those in Example 3. The difference lies in replacing 0° C. to 5° C.

The resultant electrolyte was tested to obtain a moisture content of 16.9 ppm and an electric conductivity at 25±2° C. of 7.9 ms/cm.

Example 8

A process for one-step preparing electrolyte used for lithium-iron(II) disulfide batteries, the method and steps are substantially the same as those in Example 4. The difference lies in replacing 0° C. to 5° C.

The resultant electrolyte was tested to obtain a moisture content of 14.3 ppm and an electric conductivity at 25±2° C. of 7.8 ms/cm.

Example 9

A process for one-step preparing electrolyte used for lithium-iron(II) disulfide batteries, the method and steps are substantially the same as those in Example 3. The difference lies in replacing slowly adding 1 mol of lithium aluminum hydride, stirring and reacting for 1 h to slowly adding 1 mol of lithium aluminum hydride, stirring and reacting for 2 h.

The resultant electrolyte was tested to obtain a moisture content of 13.9 ppm and an electric conductivity at 25±2° C. of 8.7 ms/cm.

Example 10

A process for one-step preparing electrolyte used for lithium-iron(II) disulfide batteries, the method and steps are substantially the same as those in Example 4. The difference lies in replacing slowly adding 4 mol of lithium hydride, stirring and reacting for 1 h to slowly adding 4 mol of lithium hydride, stirring and reacting for 2 h.

The resultant electrolyte was tested to obtain a moisture content of 16.3 ppm and an electric conductivity at 25±2° C. of 7.7 ms/cm.

Example 11

A process for one-step preparing electrolyte used for lithium-iron(II) disulfide batteries, the method and steps are substantially the same as those in Example 3. The difference lies in replacing increasing to 40° C., stirring and reacting for 2 h to increasing to 60° C., stirring and reacting for 2 h.

The resultant electrolyte was tested to obtain a moisture content of 15.8 ppm and an electric conductivity at 25±2° C. of 8.5 ms/cm.

Example 12

A process for one-step preparing electrolyte used for lithium-iron(II) disulfide batteries, the method and steps are substantially the same as those in Example 4. The difference lies in replacing increasing to 40° C., stirring and reacting for 2 h to increasing to 60° C., stirring and reacting for 2 h.

The resultant electrolyte was tested to obtain a moisture content of 15.3 ppm and an electric conductivity at 25±2° C. of 7.9 ms/cm.

Example 13

A process for one-step preparing electrolyte used for lithium-iron(II) disulfide batteries, the method and steps are substantially the same as those in Example 3. The difference lies in replacing increasing to 40° C., stirring and reacting for 2 h to increasing to 40° C., stirring and reacting for 3 h.

The resultant electrolyte was tested to obtain a moisture content of 14.8 ppm and an electric conductivity at 25±2° C. of 8.4 ms/cm.

Example 14

A process for one-step preparing electrolyte used for lithium-iron(II) disulfide batteries, the method and steps are substantially the same as those in Example 4. The difference lies in replacing increasing to 40° C., stirring and reacting for 2 h to increasing to 40° C., stirring and reacting for 3 h.

The resultant electrolyte was tested to obtain a moisture content of 15.5 ppm and an electric conductivity at 25±2° C. of 7.7 ms/cm.

Example 15

A process for one-step preparing electrolyte used for lithium-iron(II) disulfide batteries, the method and steps are substantially the same as those in Example 3. The difference lies in replacing the mixed solution comprising 25 wt. % of glycol dimethyl ether and 75 wt. % of 1,3-dioxolame to the mixed solution comprising 45 wt. % of glycol dimethyl ether and 55 wt. % of 1,3-dioxolame.

The resultant electrolyte was tested to obtain a moisture content of 15.2 ppm and an electric conductivity at 25±2° C. of 8.1 ms/cm.

Example 16

A process for one-step preparing electrolyte used for lithium-iron(II) disulfide batteries, the method and steps are substantially the same as those in Example 4. The difference lies in replacing the mixed solution comprising 25 wt. % of glycol dimethyl ether and 75 wt. % of 1,3-dioxolame to the mixed solution comprising 45 wt. % of glycol dimethyl ether and 55 wt. % of 1,3-dioxolame.

The resultant electrolyte was tested to obtain a moisture content of 15.9 ppm and an electric conductivity at 25±2° C. of 7.4 ms/cm.

Experimental Tests:

The electrolytes prepared in Examples 1-16 were respectively used for preparing 1.5V primary lithium batteries, and making into winding cylindrical AA type-lithium-iron(II) disulfide batteries. The injection volume of the electrolyte for single battery was 1.8 g.

The prepared lithium-iron(II) disulfide batteries were used for testing the capacity of new batteries and capacity of batteries stored at 60° C. for 30 days. The capacity was tested by discharging at 200 mA constant current discharge, and the cut-off voltage was 0.8 v.

In addition, the same type lithium-iron(II) disulfide batteries purchased in the market were used as control group for testing under the same conditions. The results are shown in Table 1 below.

TABLE 1

Capacity data comparison of the examples and control group

| Groups | New battery capacity/mAh | Capacity of batteries stored at 60° C. for 30 days/mAh | Self-discharge rate/% |
| --- | --- | --- | --- |
| Control group | 3120 | 3104 | 0.51% |
| Example 1 | 3087 | 3071 | 0.52% |
| Example 2 | 3099 | 3084 | 0.48% |
| Example 3 | 3112 | 3105 | 0.55% |
| Example 4 | 3132 | 3121 | 0.38% |
| Example 5 | 3120 | 3117 | 0.42% |
| Example 6 | 3101 | 3095 | 0.52% |
| Example 7 | 3114 | 3098 | 0.51% |
| Example 8 | 3121 | 3104 | 0.54% |
| Example 9 | 3127 | 3109 | 0.58% |
| Example 10 | 3142 | 3122 | 0.64% |
| Example 11 | 3125 | 3108 | 0.54% |
| Example 12 | 3109 | 3091 | 0.58% |
| Example 13 | 3113 | 3098 | 0.48% |
| Example 14 | 3126 | 3109 | 0.54% |
| Example 15 | 3116 | 3100 | 0.51% |
| Example 16 | 3102 | 3085 | 0.55% |

According to Table 1, it can be seen that lithium-iron(II) disulfide batteries prepared from the electrolytes made in Examples 1-16 of the present invention have close new battery capacity, capacity of batteries stored at 60° C. for 30 days/mAh and self-discharge rate as compared to the batteries in control group, and there is no significant difference. That shows that the electrolyte prepared in the present invention can be applied in lithium-iron(II) disulfide batteries.

Example 17

A process for one-step preparing electrolyte used for lithium-iron(II) disulfide batteries comprises the following steps of: in a glove box having an atmosphere containing nitrogen with a purity of greater than or equal to 99.99% as an inert gas, an oxygen content of 0.5 ppm and a moisture content of 1.5 ppm, adding 0.5 mol of anhydrous aluminum triiodide at 40° C. into 1 L of a mixed solution of glycol dimethyl ether and 1,3-dioxolame and stirring for 2 h, then adding 1.8 mol of anhydrous lithium hydroxide, stirring and reacting for 8 h, centrifuging, filtering to obtain an electrolyte used for lithium-iron(II) disulfide batteries;

wherein the mixed solution comprises 25 wt. % of glycol dimethyl ether and 75 wt. % of 1,3-dioxolame; the mixed solution was dehydrated with molecular sieves to a moisture content of less than or equal to 10 ppm before use.

The resultant electrolyte was tested to obtain a moisture content of 17.4 ppm and an electric conductivity at 25±2° C. of 2.37 ms/cm.

Example 18

A process for one-step preparing electrolyte used for lithium-iron(II) disulfide batteries comprises the following steps of: in a glove box having an atmosphere containing argon with a purity of greater than or equal to 99.99% as an inert gas, an oxygen content of 0.5 ppm and a moisture content of 10 ppm, adding 1 mol of anhydrous aluminum triiodide at 40° C. into 1 L of a mixed solution of glycol dimethyl ether and 1,3-dioxolame and stirring for 2 h, then adding 3.6 mol of anhydrous lithium hydroxide, stirring and reacting for 8 h, centrifuging, filtering to obtain an electrolyte used for lithium-iron(II) disulfide batteries;

wherein the mixed solution comprises 25 wt. % of glycol dimethyl ether and 75 wt. % of 1,3-dioxolame; the mixed solution was dehydrated with molecular sieves to a moisture content of less than or equal to 10 ppm before use.

The resultant electrolyte was tested to obtain a moisture content of 22.2 ppm and an electric conductivity at 25±2° C. of 7.5 ms/cm.

Example 19

A process for one-step preparing electrolyte used for lithium-iron(II) disulfide batteries comprises the following steps of: in a glove box having an atmosphere containing nitrogen with a purity of greater than or equal to 99.99% as an inert gas, an oxygen content of 0.5 ppm and a moisture content of 1.5 ppm, adding 1 mol of anhydrous aluminum triiodide at 40° C. into 1 L of a mixed solution of glycol dimethyl ether and 1,3-dioxolame and stirring for 2 h, then adding 3.6 mol of anhydrous lithium hydroxide, stirring and reacting for 8 h, centrifuging, filtering to obtain an electrolyte used for lithium-iron(II) disulfide batteries;

wherein the mixed solution comprises 25 wt. % of glycol dimethyl ether and 75 wt. % of 1,3-dioxolame; the mixed solution was dehydrated with molecular sieves to a moisture content of less than or equal to 10 ppm before use.

The resultant electrolyte was tested to obtain a moisture content of 23.8 ppm and an electric conductivity at 25±2° C. of 7.8 ms/cm.

Example 20

A process for one-step preparing electrolyte used for lithium-iron(II) disulfide batteries comprises the following steps of: in a glove box having an atmosphere containing nitrogen with a purity of greater than or equal to 99.99% as an inert gas, an oxygen content of 0.5 ppm and a moisture content of 1.5 ppm, adding 1 mol of anhydrous aluminum triiodide at 40° C. into 1 L of a mixed solution of glycol dimethyl ether and 1,3-dioxolame and stirring for 2 h, then adding 10 mol of anhydrous lithium hydroxide, stirring and reacting for 8 h, centrifuging, filtering to obtain an electrolyte used for lithium-iron(II) disulfide batteries;

wherein the mixed solution comprises 25 wt. % of glycol dimethyl ether and 75 wt. % of 1,3-dioxolame; the mixed solution was dehydrated with molecular sieves to a moisture content of less than or equal to 10 ppm before use.

The resultant electrolyte was tested to obtain a moisture content of 28.9 ppm and an electric conductivity at 25±2° C. of 8.0 ms/cm.

Example 21

A process for one-step preparing electrolyte used for lithium-iron(II) disulfide batteries comprises the following steps of: in a glove box having an atmosphere containing nitrogen with a purity of greater than or equal to 99.99% as an inert gas, an oxygen content of 0.5 ppm and a moisture content of 1.5 ppm, adding 1 mol of anhydrous aluminum triiodide at 40° C. into 1 L of a mixed solution of glycol dimethyl ether and 1,3-dioxolame and stirring for 2 h, then adding 6 mol of anhydrous lithium hydroxide, stirring and reacting for 8 h, centrifuging, filtering to obtain an electrolyte used for lithium-iron(II) disulfide batteries; wherein the mixed solution comprises 25 wt. % of glycol dimethyl ether and 75 wt. % of 1,3-dioxolame; the mixed solution was dehydrated with molecular sieves to a moisture content of less than or equal to 10 ppm before use.

The resultant electrolyte was tested to obtain a moisture content of 25.6 ppm and an electric conductivity at 25±2° C. of 7.9 ms/cm.

Example 22

A process for one-step preparing electrolyte used for lithium-iron(II) disulfide batteries comprises the following steps of: in a glove box having an atmosphere containing nitrogen with a purity of greater than or equal to 99.99% as an inert gas, an oxygen content of 0.5 ppm and a moisture content of 1.5 ppm, adding 1 mol of anhydrous aluminum triiodide at 40° C. into 1 L of a mixed solution of glycol dimethyl ether and 1,3-dioxolame and stirring for 2 h, then adding 6 mol of anhydrous lithium hydroxide, stirring and reacting for 8 h, centrifuging, filtering to obtain an electrolyte used for lithium-iron(II) disulfide batteries; wherein the mixed solution comprises 45 wt. % of glycol dimethyl ether and 55 wt. % of 1,3-dioxolame; the mixed solution was dehydrated with molecular sieves to a moisture content of less than or equal to 10 ppm before use.

The resultant electrolyte was tested to obtain a moisture content of 24.3 ppm and an electric conductivity at 25±2° C. of 7.8 ms/cm.

Example 23

A process for one-step preparing electrolyte used for lithium-iron(II) disulfide batteries comprises the following steps of: in a glove box having an atmosphere containing nitrogen with a purity of greater than or equal to 99.99% as an inert gas, an oxygen content of 0.5 ppm and a moisture content of 1.5 ppm, adding 1 mol of anhydrous aluminum triiodide at 70° C. into 1 L of a mixed solution of glycol dimethyl ether and 1,3-dioxolame and stirring for 2 h, then adding 3.6 mol of anhydrous lithium hydroxide, stirring and reacting for 8 h, centrifuging, filtering to obtain an electrolyte used for lithium-iron(II) disulfide batteries; wherein the mixed solution comprises 25 wt. % of glycol dimethyl ether and 75 wt. % of 1,3-dioxolame; the mixed solution was dehydrated with molecular sieves to a moisture content of less than or equal to 10 ppm before use.

The resultant electrolyte was tested to obtain a moisture content of 21.9 ppm and an electric conductivity at 25±2° C. of 8.8 ms/cm.

Example 24

A process for one-step preparing electrolyte used for lithium-iron(II) disulfide batteries comprises the following steps of: in a glove box having an atmosphere containing nitrogen with a purity of greater than or equal to 99.99% as an inert gas, an oxygen content of 0.5 ppm and a moisture content of 1.5 ppm, adding 1 mol of anhydrous aluminum triiodide at 40° C. into 1 L of a mixed solution of glycol dimethyl ether and 1,3-dioxolame and stirring for 0.5 h, then adding 3.6 mol of anhydrous lithium hydroxide, stirring and reacting for 8 h, centrifuging, filtering to obtain an electrolyte used for lithium-iron(II) disulfide batteries; wherein the mixed solution comprises 25 wt. % of glycol dimethyl ether and 75 wt. % of 1,3-dioxolame; the mixed solution was dehydrated with molecular sieves to a moisture content of less than or equal to 10 ppm before use.

The resultant electrolyte was tested to obtain a moisture content of 22.6 ppm and an electric conductivity at 25±2° C. of 4.8 ms/cm.

Example 25

A process for one-step preparing electrolyte used for lithium-iron(II) disulfide batteries comprises the following steps of: in a glove box having an atmosphere containing nitrogen with a purity of greater than or equal to 99.99% as an inert gas, an oxygen content of 0.5 ppm and a moisture content of 1.5 ppm, adding 1 mol of anhydrous aluminum triiodide at 40° C. into 1 L of a mixed solution of glycol dimethyl ether and 1,3-dioxolame and stirring for 2 h, then adding 3.6 mol of anhydrous lithium hydroxide, stirring and reacting for 6 h, centrifuging, filtering to obtain an electrolyte used for lithium-iron(II) disulfide batteries; wherein the mixed solution comprises 25 wt. % of glycol dimethyl ether and 75 wt. % of 1,3-dioxolame; the mixed solution was dehydrated with molecular sieves to a moisture content of less than or equal to 10 ppm before use.

The resultant electrolyte was tested to obtain a moisture content of 21.5 ppm and an electric conductivity at 25±2° C. of 5.5 ms/cm.

Experimental Tests:

The electrolytes prepared in Examples 17-25 were respectively used for preparing 1.5V primary lithium batteries, and making into winding cylindrical AA type-lithium-iron(II) disulfide batteries according to conventional methods with other conventional components. The injection volume of the electrolyte for single battery was 1.8 g.

The prepared lithium-iron(II) disulfide batteries were used for testing the capacity of new batteries and capacity of batteries stored at 60° C. for 30 days/mAh. The capacity was tested by discharging at 200 mA constant current discharge, and the cut-off voltage was 0.8 v.

In addition, the same type lithium-iron(II) disulfide batteries purchased in the market were used as control group for testing under the same conditions. The results are shown in Table 2 below.

TABLE 2

Capacity data comparison of the examples and control group

| Groups | New battery capacity/mAh | Capacity of batteries stored at 60° C. for 30 days/mAh | Self-discharge rate/% |
|---|---|---|---|
| Control group | 3120 | 3104 | 0.51% |
| Example 17 | 3058 | 3045 | 0.43% |
| Example 18 | 3112 | 3098 | 0.45% |
| Example 19 | 3102 | 3085 | 055% |
| Example 20 | 3152 | 3135 | 0.54% |
| Example 21 | 3144 | 3129 | 0.48% |
| Example 22 | 3121 | 3105 | 0.51% |
| Example 23 | 3170 | 3152 | 0.57% |
| Example 24 | 3081 | 3066 | 0.49% |
| Example 25 | 3092 | 3075 | 0.55% |

According to Table 2, it can be seen that lithium-iron(II) disulfide batteries prepared from the electrolytes made in Examples 17-25 of the present invention have close new battery capacity, capacity of batteries stored at 60° C. for 30 days and self-discharge rate as compared to the batteries in control group, and there is no significant difference. That shows that the electrolyte prepared in the present invention can be applied in lithium-iron(II) disulfide batteries.

The aforesaid examples are preferred embodiments of the present invention, but the embodiments of the present invention are not limited by the aforesaid examples. Any other changes, modifications, replacements, combinations, or simplifications which do not depart from the spirit and principle of the present invention will be deemed as equivalent substitutions, and will be comprised within the protection scope of the present invention.

The invention claimed is:

1. A process for one-step preparing electrolyte used for a lithium-iron(II) disulfide battery, comprising steps of: adding anhydrous aluminum triiodide at 40-70° C. into an organic solvent in an inert atmosphere, stirring for 0.5-2 h, then adding anhydrous lithium hydroxide, stirring and reacting for 6-8 h, centrifuging and filtering to obtain an electrolyte used for lithium-iron(II) disulfide batteries, wherein the anhydrous aluminum triiodide and anhydrous lithium hydroxide have a molar ratio of 1:(3.6-10).

2. The process according to claim 1, wherein an inert gas in the inert atmosphere is one selected from the group consisting of nitrogen and argon.

3. The process according to claim 1, wherein the inert atmosphere has a gas purity of greater than or equal to 99.99%, a moisture content of less than or equal to 10 ppm, and an oxygen content of less than or equal to 0.5 ppm.

4. The process according to claim 1, wherein the organic solvent is dehydrated before use.

5. The process according to claim 4, wherein the dehydrated organic solvent has a moisture content of less than or equal to 10 ppm.

6. The process according to claim 4, wherein the organic solvent is dehydrated by using molecular sieves.

7. The process wherein according to claim 1, wherein the organic solvent is a mixed solvent of glycol dimethyl ether and 1,3-dioxolane.

8. The process according to claim 1, wherein the organic solvent is a mixed solvent of 25-45 wt. % of glycol dimethyl ether and 55-75 wt. % of 1,3-dioxolane.

\* \* \* \* \*